US006195631B1

(12) United States Patent
Alshawi et al.

(10) Patent No.: US 6,195,631 B1
(45) Date of Patent: Feb. 27, 2001

(54) METHOD AND APPARATUS FOR AUTOMATIC CONSTRUCTION OF HIERARCHICAL TRANSDUCTION MODELS FOR LANGUAGE TRANSLATION

(75) Inventors: Hiyan Alshawi; Shona Douglas, both of Madison, NJ (US)

(73) Assignee: AT&T Corporation, New York, NY (US)

( * ) Notice: Subject to any disclaimer, the term of this patent is extended or adjusted under 35 U.S.C. 154(b) by 0 days.

(21) Appl. No.: 09/198,109

(22) Filed: Nov. 23, 1998

Related U.S. Application Data

(60) Provisional application No. 60/081,772, filed on Apr. 15, 1998.

(51) Int. Cl.[7] .................................................... G06F 17/28
(52) U.S. Cl. ............................................. 704/4; 704/2
(58) Field of Search .............................. 704/2, 3, 4–8, 704/277, 270, 257; 707/530, 536

(56) References Cited

U.S. PATENT DOCUMENTS

| | | | |
|---|---|---|---|
| 4,868,750 | * 9/1989 | Kucera et al. | 704/9 |
| 5,510,981 | * 4/1996 | Berger et al. | 704/2 |
| 5,768,603 | * 6/1998 | Brown et al. | 704/9 |
| 5,805,832 | * 9/1998 | Brown et al. | 704/2 |
| 5,815,196 | * 9/1998 | Alshawi | 704/277 |
| 5,867,811 | * 2/1999 | O'Donoghue | 704/1 |
| 5,870,706 | * 2/1999 | Alshawi | 704/255 |

OTHER PUBLICATIONS

Alshawi, H. et al., "Head Automata and Bilingual Tiling: Translation with Minimal Representations". In Proceeding of the 34 th Annual Meeting of the Association for Computational Linguistics, Santa Cruz, CA 1996. pp. 1–17.*

Alshawi, H. et al., "A Comparison of Head Transducers and Transfer for a Limited Domain Translation Application". In Proceedings of the 35th Annual Meeting of the Association for Computational Linguistics. Madrid. Jun. 1997.*

Alshawi, H. et al., "State Transition Cost Functions and an Application to Language Translation". IEEE 1997.*

Alshawi, H. "Head Automata for Speech Translation" Proc. Fourth International Conference on Spoken Language Processing, Philadelphia, Pennsylvanis, 1996.*

Gale, W., et al., "Identifying Word Correspondences in parallel Texts" Computational Linguistics, 1992.*

* cited by examiner

Primary Examiner—Forester W. Isen
Assistant Examiner—Patrick N. Edouard
(74) Attorney, Agent, or Firm—Oliff & Berridge, PLC

(57) ABSTRACT

A method and apparatus for automatically constructing hierarchical transduction models for language translation is presented. The input to the construction process may be a database of examples each consisting of a transcribed speech utterance and its translation into another language. A translation pairing score is assigned (or computed) for translating a word in the source language into each of the possible translations it has in the target language. For each instance of the resulting training dataset, a head transducer may be constructed that translates the source string into the target string by splitting the source string into a source head word, the words preceding the source head word, and the words following the source head word. This process may be performed recursively to generate a set of transducer fragments. The transducer fragments may form a statistical head transducer model. The head transducer translation model may then be input into a transduction search module.

22 Claims, 5 Drawing Sheets

METHOD AND APPARATUS FOR AUTOMATIC CONSTRUCTION OF HIERARCHICAL TRANSDUCTION MODELS FOR LANGUAGE TRANSLATION

This non-provisional application claims the benefit of U.S. Provisional Application Ser. No. 60/081,772, filed Apr. 15, 1998, the subject matter of which is incorporated herein by reference.

BACKGROUND OF THE INVENTION

1. Field of Invention

The invention relates to automatic language translation. In particular, the invention relates to a method and apparatus for training language translation systems automatically from bilingual data.

2. Description of Related Art

Language translation systems have existed for several years. These systems typically require a large hand-coding effort to construct translation lexicons and rule sets. This type of manual coding is expensive in terms of time and the level of expertise required. A number of approaches have been proposed for automatically learning translation models from examples provided by human translators. However, the types of models created suffer from a number of problems, such as low translation quality or a requirement for very large amounts of training data.

SUMMARY OF THE INVENTION

A method and apparatus for automatically constructing hierarchical transduction models for language translation is presented. The input to the construction process may be a database of examples each consisting of a transcribed speech utterance and its translation into another language. A translation pairing score is assigned (or computed) for translating a word in the source language into each of the possible translations it has in the target language. For each instance of the resulting training dataset, a head transducer may be constructed that translates the source string into the target string by splitting the source string into a source head word, the words preceding the source head word, and the words following the source head word. This process may be performed recursively to generate a set of transducer fragments. The transducer fragments may form a statistical head transducer model. The head transducer translation model may then be input into a transduction search module.

These and other features and advantages of this invention are described or apparent from the following detailed description of the preferred embodiments.

BRIEF DESCRIPTION OF THE DRAWINGS

The invention is described in detail with reference to the following drawings, wherein like numerals represent like elements and wherein.

DETAILED DESCRIPTION OF PREFERRED EMBODIMENTS

Figure 1:
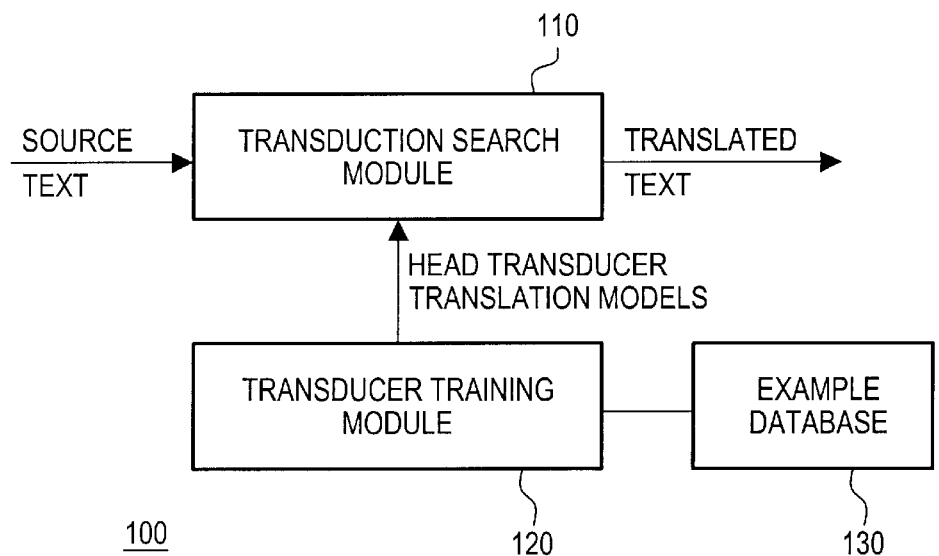
FIG. 1 is an exemplary block diagram of a training language translation system.

FIG. 1 shows an exemplary block diagram of an automatically trainable language translation system 100 that includes transduction search module 110 connected to transducer training module 120. The transducer training module 120 is also connected to a database 130. The database 130 may be any memory device internal or external to the transducer training module 120. The database 130 contains data sets of exemplary source and target strings which are input to the transducer training module 120. The transducer training module 120 processes the source and target strings and creates head transducer translation models for output to the transduction search module 110. The transduction search module 110 then processes source text from one language and outputs translated text in another language.

To better understand how the transducer training module 120 produces head transducer translation models for input into the transduction search module 110, the principles of language translation systems will be discussed. Such methods, in particular, language translation systems using head transducers are described for example, in U.S. patent application Ser. No. 08/665,182, "METHOD AND APPARATUS FOR LANGUAGE TRANSLATION," filed Jun. 14, 1996 and incorporated herein by reference in its entirety.

Lexical head transduction is carried out with a "head transducer model" that consists of a collection of head transducers. The purpose of a particular transducer is to translate a specific source word $\omega$ (the "head" word) into a target word or words $f(\omega)$, and further to translate sequences of source words to the left and right of co to sequences of target words to the left and right of $f(\omega)$. These left and right sequences are themselves translated with subsidiary (or dependent) transducers, and so on, until the sub-sequences consist of single words. Thus, the entire set of transducers effects a hierarchical transduction of the source string into the target string.

Figure 2:
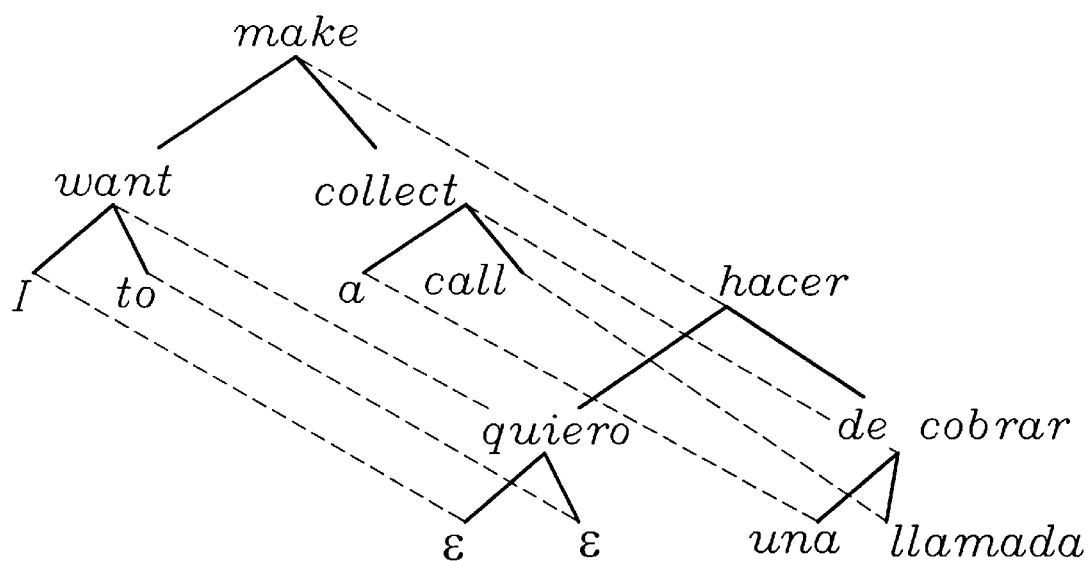
FIG. 2 is a diagram of a hierarchical dependency tree.

For example, consider the English sentence "I want to make a collect call." The sentence can be viewed as a main or head word and a number of dependents. The subsequences of words before and after the head word can similarly be decomposed into head words and dependents, resulting in a hierarchical dependency tree of the sort shown in FIG. 2. The left tree in FIG. 2 is read as follows: the head word of the sentence is "make"; it has two dependents, "want" on the left, and "call" on the right. The left dependent "want" has two dependents, "I" on the left and "to" on the right. The right dependent "collect" has one dependent on the left, "call", which in turn has one dependent on the right "call". This tree is not necessarily the one that would be found in grammar textbooks. However, the tree is learned automatically according to the data encountered and the method of leaning.

To translate "I want to make a collect call" into its equivalent in Spanish requires a set of transducers, one for each head word in the English dependency tree pairing it with its Spanish equivalent The dependency trees for English and Spanish for the whole translation are shown in FIG. 2. In the figure, $\epsilon$ is the empty string.

Figure 3:
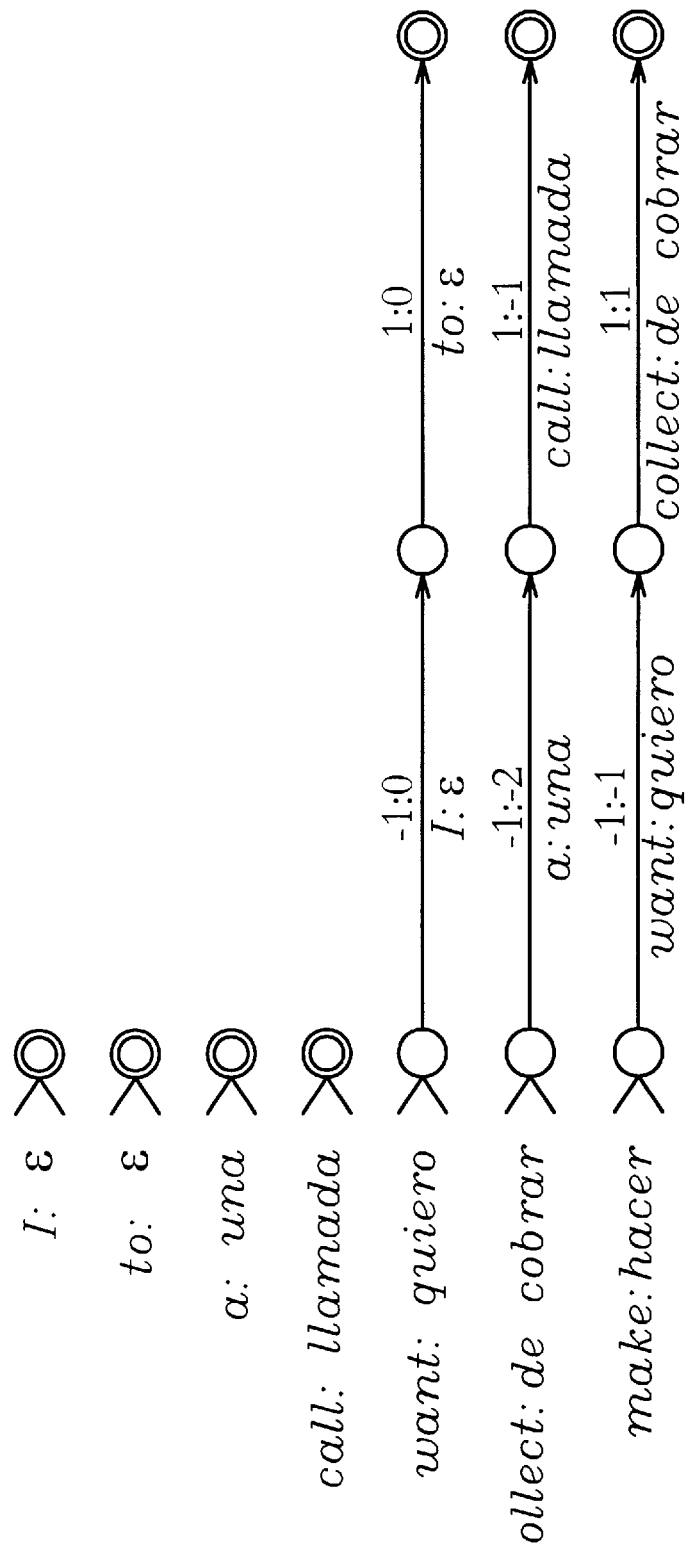
FIG. 3 is an exemplary diagram of a transducer network.

The portion of the transducer network sufficient to carry out the translation of "I want to make a collect call" is given in FIG. 3. The application of these transducers results in the output of the Spanish string, set forth below. For example, the transducer for "call" matches "call" in the input string and pairs it with output string "llamada." The transducer for "a" matches "a" in the input string and pairs it with the output string "una". The transducer for "collect" matches "collect", pairs it with "de cobrar" and performs the following transitions (for the sentence "I want to make a collect call"):

To the left of "collect" in the sentence to be translated (source position −1), it matches the head word "a" of the subsidiary transducer for "a" paired with "una". The output string "una" is placed at the second position to the left of "de cobrar" (target position −2).

To the right of "collect" in the sentence to be translated (source position +1), it matches the head word "call" of the subsidiary transducer for "call" paired with "llamada". The output string "llamada" is placed at the first position to the left of "de cobrar" (target position −1).

Thus, the part of the dependency tree headed by "collect" results in the output string "una llamada de cobrar".

A distinguishing property of head transducers, as compared to "standard" finite state transducers, is that they perform a transduction outwards from the head word in the input string rather than by traversing the input string from left to right. A head transducer for translating source word $\omega$ to target word or words $\theta(\omega)$ consists of a set of states $q_0$, $q_1$, $q_2$, . . . and transitions characterized by:

$$(q_i, q_j, \omega_d, f(\omega_d)\alpha, \beta, c)$$

where the transition is from state $q_i$ to state $q_j$, matching the next source dependent $\omega_d$ at position $\alpha$ relative to $\omega$ and writing a target dependent $f(\omega_d)$ at position $\beta$ relative to $f(\omega)$. The transition has a weight, or cost, c. Positions left of a head word (in the source or target phrase) are indicated with negative integers, while those right of the head word are indicated with positive integers.

When a model is applied to translate a source sentence, the chosen derivation of the target string is the derivation that minimizes the sum of weights for the transitions involved. The transduction search algorithm we use to apply the translation model is a bottom-up dynamic programming algorithm described in U.S. patent application Ser. No. 08/665,182.

Figure 4:
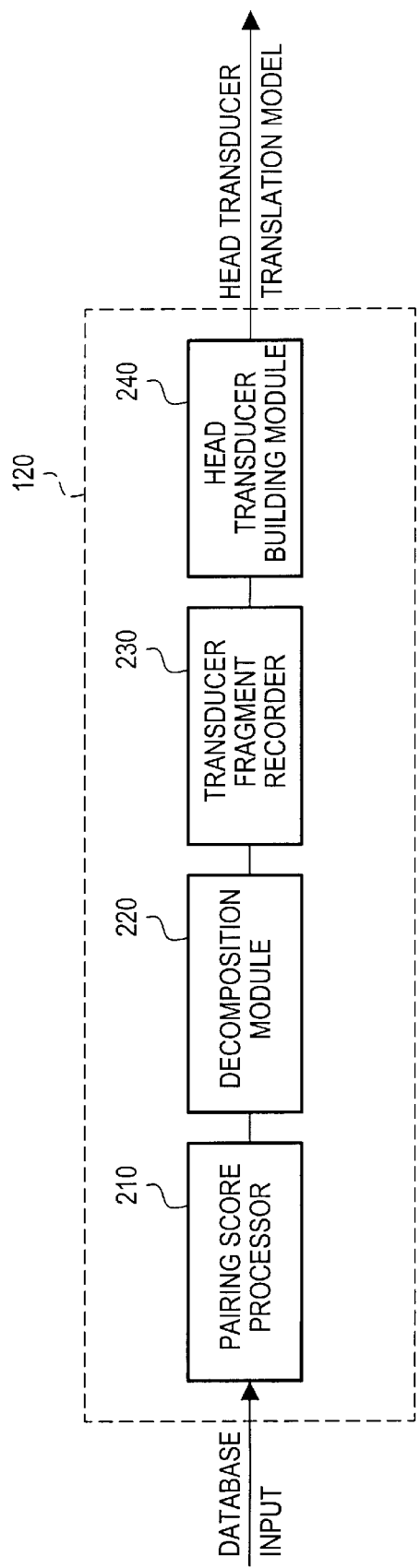
FIG. 4 is an exemplary block diagram of the transducer training module of FIG. 1.

FIG. 4 is a more detailed exemplary block diagram of transducer training module 120 shown in FIG. 1. The transducer training module consists of the pairing score processor 210, the decomposition module 220, the transducer fragment recorder 230, and the head transducer building module 240.

In the transducer training module 120, paired source and target strings are input from the database 130 to pairing score processor 210 which assigns a score for possible translations of each source word into the target language. These translations of the source word may be 0, 1, or several target language words. The assignment of translation pairing scores (or effectively, a statistical bilingual dictionary) may be done using any of the various statistical measures or computations known to those skilled in the art.

One of the preferred choices of statistical measure for assigning the scores is the so-called $\phi$ correlation measure. We apply this statistic to the co-occurrence of the source word with its possible translations in the data set examples. Specifically, the preferred computation of the score for a source word $\omega$ and a translation $f(\omega)$ is given by:

$$\phi = \frac{(bc - ad)}{\sqrt{(a+b)(c+d)(a+c)(b+d)}}$$

where

N is the total number of examples $n_\omega$ is the number of examples in which $\omega$ appears in the source string $n(f(\omega))$ is the number of examples in which $f(\omega)$ appears in the target string b is the number of examples in which both $\omega$ and $f(\omega)$ appear $a = n_{f(\omega)} - b$ $c = N - n_{f(\omega)} - n_\omega + b$ $d = n_\omega - b$ Once scores have been assigned, the source and target strings are input into the decomposition module 220. The decomposition module 220 recursively decomposes around the head word $\omega$ in the source string and a corresponding target translation $f(\omega)$ in the target sting. The source string is first split into the head word $\omega$, the words to the left of $\omega$ (the "left substring"), and the words to the right of $\omega$ (the "right substring"). The decomposition is recursive in that a subsidiary split of the left substring is made around a left head word $\omega_l$ and the right substring is split around the right head word $\omega_r$. This process of decomposition continues for each left and right substring until the source string only contains a single word.

There are many possible ways of decomposing the strings in this way. One method is to use the decomposition which is such that:

1. The source head word o) is paired with a translation $f(\omega)$ appearing in the target string of the example for which the score $\phi$ of the pairing is as determined according to the equation above.
2. For any two distinct words $\omega_1$ and $\omega_2$ in the source, $f(\omega_1)$ does not overlap with $f(\omega_2)$.
3. The translation of the left substring is a contiguous segment of the target string.
4. The translation of the right substring is a contiguous segment of the target string.
5. The total of all the translation pairing scores of the source head word and its translation that take part in each successive split is maximized for the entire decomposition process.

This decomposition, which maximizes the sum of pairing scores, is computed using a dynamic programming procedure. In this procedure, the pairing scores are first retrieved for each possible pair allowed by the example. Adjacent source substrings are then combined to determine the highest scoring collection of pairings for successively larger substrings satisfying the above constraints. The successively larger substrings eventually span the entire source substring, yielding the highest scoring set of pairings for the entire example.

Figure 5:
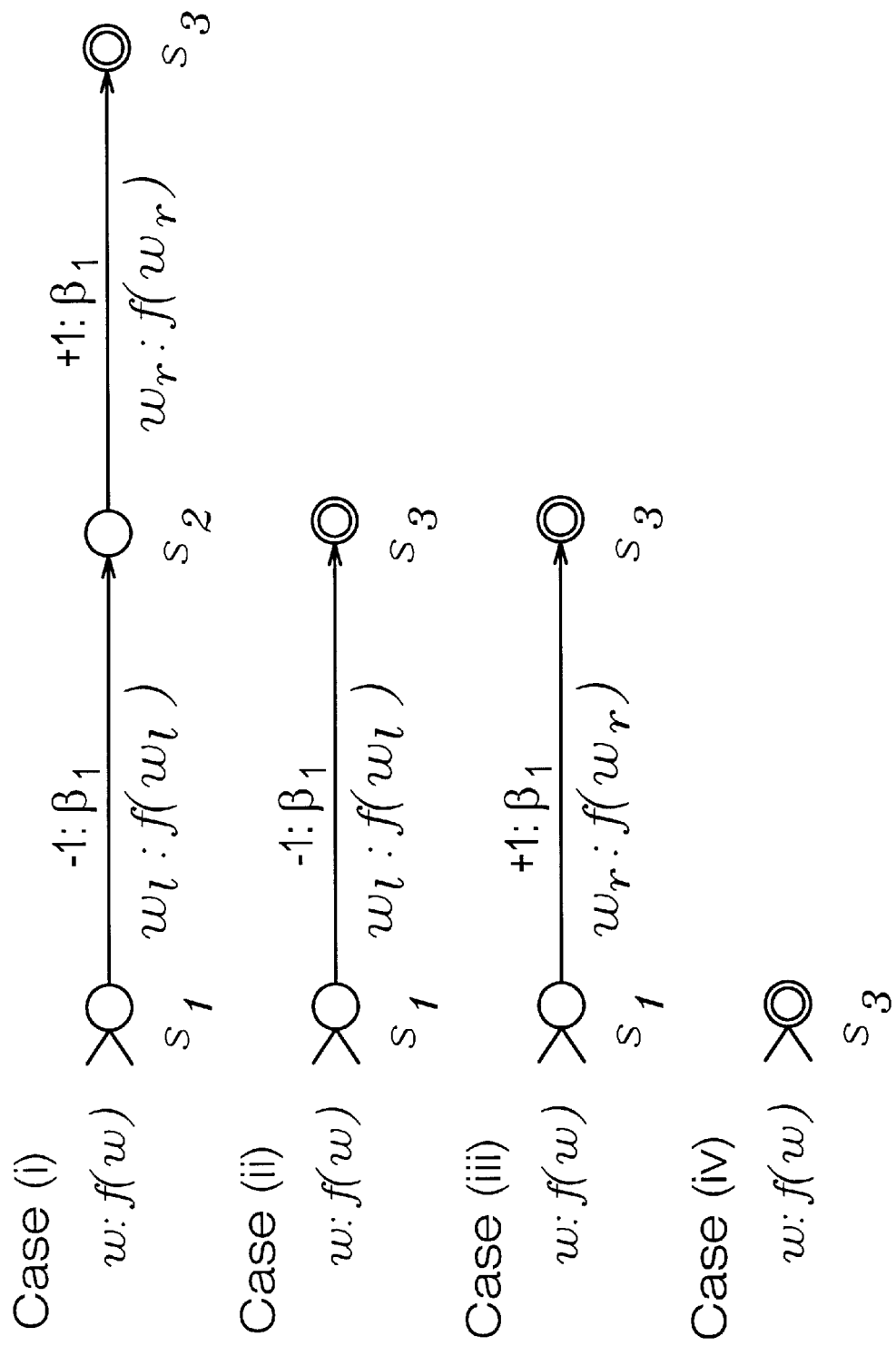
FIG. 5 is a diagram of four cases of hypothesized transducer fragments.

The decomposed strings are then input into the transducer fragment recorder 230. For each split, or subsidiary split, of the source and target strings, the transducer fragment recorder 230 records the fragments of a hypothesized head transducer that take part in translating the source string into the target string. The specific cases of hypothesized transducer fragments are those indicated in FIG. 5 covering the four cases:

(i) The left and right source substrings are both empty;

(ii) The right source substring is empty;

(iii) The left source substring is empty; and (iv) The left and right source substrings are both empty (i.e. the source substring consists of only the source head word).

Here we describe the first case only since, as shown in the figure, the fragments recorded by the first case cover those for the other three cases. The construction requires an indexing function $\sigma$ from four strings to integers identifying constructed transducer states. The same state indexing function is used for all examples in the dataset, ensuring that the transducer fragments recorded for the entire dataset will form a complete collection of head-transducer transition networks. The four strings of the indexing function are the head word in the source, its translation in the target, a dependent source word, and the state. In our preferred construction described here, the state may be "initial", "internal", or "final".

The detailed construction for the first case is as follows, where $s_1$ is the initial state and $s_2$ is the final state for a head transducer for translating $\omega$ into $f(\omega)$:

Look up, or construct, the state $s_1$ numbered $\sigma(\omega, f(\omega),$ initial, initial).

Look up, or construct, the state $s_2$ numbered $\sigma(\omega, f(\omega),$ $\omega_1$, internal).

Construct a transition from $s_1$ to $s_2$, with source dependent $\omega_1$, target dependent $f(\omega_1)$, source position −1 and target position $\beta_1 = f(\omega) - f(\omega_1)$.

Look up, or construct, the state $s_3$ numbered $\sigma(\omega, f(\omega),$ final, final).

Construct a transition from $s_2$ to $s_3$, with source dependent $\omega_r$, target dependent $f(\omega_r)$, source position +1 and target position $\beta_2 = f(\omega) - f(\omega_r)$.

The transducer agments output by the transducer fragment recorder 230 are then input into the head transducer building module 240. The head transducer building module 240 aggregates transducer fragments for the entire set of example translations to form the counts of the statistical head transducer model. There are several methods to assign weights to the transitions to improve translation quality, including those based on standard statistical modeling techniques, such as simple maximum likelihood. A simple example of this weight computation for the transitions emerging from a state is to use the negated log of conditional probabilities, for each of the transitions. These conditional probabilities are estimated from the frequency of each transition for the entire dataset. The resulting head transducer model is input to the transduction search module 110 and can be used directly to carry out automatic language translation, as described in U.S. patent application Ser. No. 08/665,182.

Figure 6:
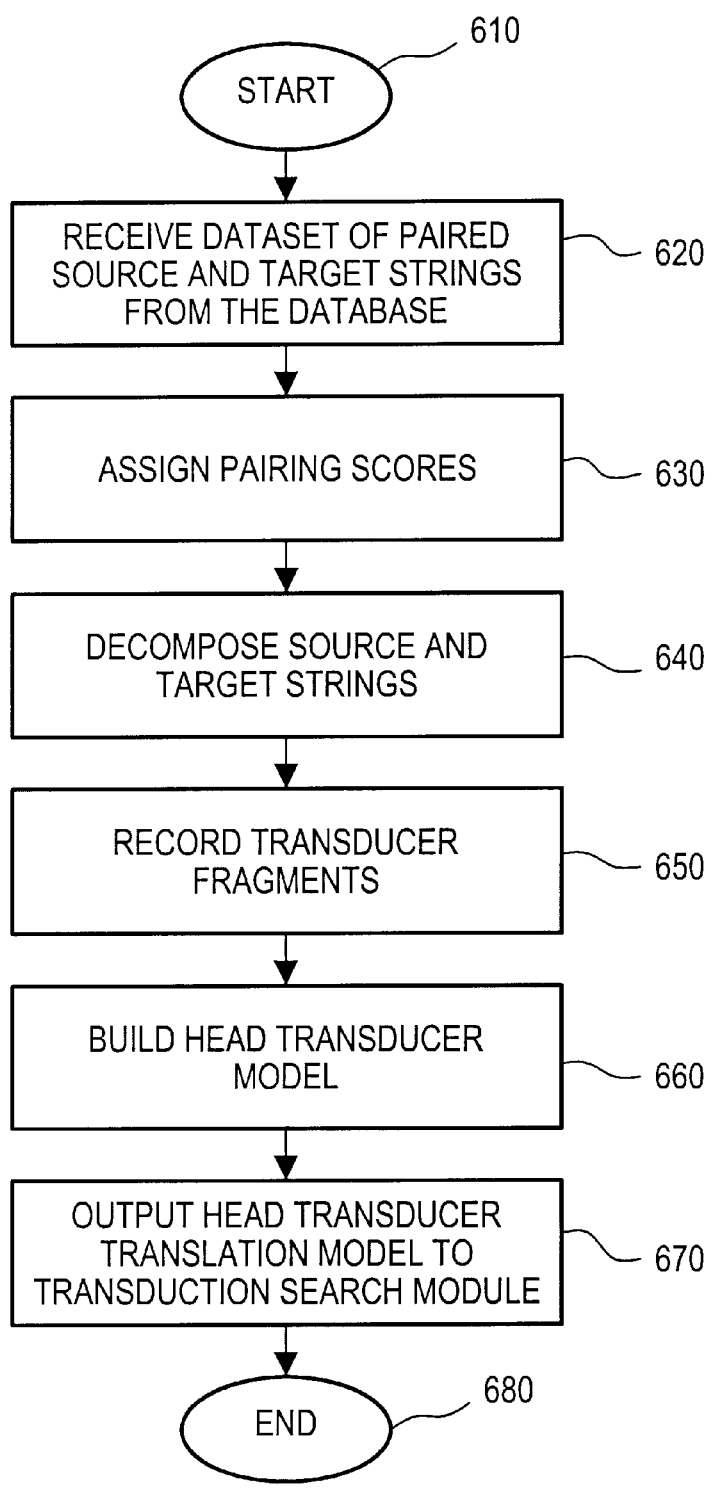
FIG. 6 is a flowchart of the transducer training process.

FIG. 6 is a flowchart of the transducer training process. Beginning at step 610, the process goes to step 620 where a dataset of paired source and target strings is received by the transducer training module 120 from the database 130. In step 630, translation pairing scores are assigned (or computed, for example) for translating a word in the source language into each of the possible translations it has in the target language. As discussed above, the assignment of translation pairing scores may be done using any of the various statistical measures or computations known to those skilled in the art.

Then, at step 640, the transducer training module 120 decomposes the source and target strings. This is done by splitting the source string into a source head word, the words preceding the source head word (the left substring), and the words following the source head word (the right substring).

In step 650, the transducer training module 120 records transducer fragments of a hypothesized head transducer that takes part in translating the source string into the target string. In step 660, the transducer training module 120 aggregates the transducer fragments created for an entire set of example translations to form the counts of a statistical head transducer model. In step 670 the transducer training module 120 outputs the head transducer translation model to the transduction search module 110, and goes to step 680 and ends.

The transducer training module 120 may be implemented on a general purpose computer. However, the transducer training module 120 may also be implemented using a special purpose computer, a microprocessor or microcontroller and peripheral integrated circuit elements, and Application Specific Integrated Circuit (ASIC) or other integrated circuits, a hardwired electronic or logic circuit, such as a discrete element circuit, a programmable logic device, such as a PLD, PLA, FGPA, or PLA, or the like. In general, any device performing the functions of a transducer training module 120, as described herein, may be used.

Although the invention is described in terms of transcribed utterances paired with their translations, the invention may also apply to text sentences paired with their translations, for example. More generally, the invention may apply to learning a transduction model from examples of converting sequences of input symbols into sequences of output symbols.

While this invention has been described in conjunction with the specific embodiments thereof, it is evident that many alternatives, modifications, and variations will be apparent to those skilled in the art Accordingly, preferred embodiments of the invention as set forth herein are intended to be illustrative, not limiting. Various changes may be made without departing from the spirit and scope of the invention as described in the following claims.

What is claimed is:

1. A method for constructing transduction models for language translation, comprising:

receiving a set of transcribed and translated speech utterances, the transcribed and translated speech utterances comprising source strings of words in a first language, and their translations comprising target strings of words in a second language;

assigning translation pairing scores between source words in the source strings and a plurality of target words from a second language;

splitting each source string into substrings;

creating a set of transducer fragments for translating the substrings; and forming a head transducer model based on the set of transducer fragments.

2. The method of claim 1, further comprising:

identifying a head word in the source string and splitting the source string into a first substring of words preceding the head word, and a second substring of words following the head word.

3. The method of claim 2, wherein the splitting step is recursive, such that the first and second substrings are further split into smaller substrings.

4. The method of claim 1, wherein the assigning step assigns scores based on statistical measures.

5. The method of claim 4, wherein the statistical measures are φ correlation measures.

6. The method of claim 4, further comprising:

pairing the source head words with translations in the target string so as to maximize the total highest statistical measuring score.

7. The method of claim 1, further comprising:

recording the transducer fragments that take part in translating the source string into the target string.

8. The method of claim 7, wherein the recording step includes constructing at least initial and final head transducer states.

9. The method of claim 8, wherein the recording step includes constructing transitions between head transducer states.

10. The method of claim 9, wherein the forming step includes assigning weights to the transitions between head transducer states.

11. The method of claim 1, further comprising:
inputting the head transducer model into a transduction search module.

12. A transducer training apparatus that constructs transduction models for language translation, comprising:
a pairing score processor that receives a set of transcribed and translated speech utterances, the transcribed and translated speech utterances comprising source strings of words in a first language, and their translations comprising target strings of words in a second language, and assigns translation pairing scores between source words in the source strings and a plurality of target words from a second language;
a decomposition module, coupled to the pairing score processor, that splits each source string into substrings and creates a set of transducer fragments for translating the substrings; and
a head transducer building module, coupled to the decomposition module, that forms a head transducer translation model based on the set of transducer fragments.

13. The apparatus of claim 12, wherein the decomposition module identifies a head word in the source string and splits the source string into a first substring of words preceding the head word, and a second substring of words following the head word.

14. The apparatus of claim 13, wherein the decomposition module splits the source string recursively, such that the first and second substrings are further split into smaller substrings.

15. The apparatus of claim 14, wherein the pairing score processor assigns scores based on statistical measures.

16. The apparatus of claim 15, wherein the statistical measures are $\phi$ correlation measures.

17. The apparatus of claim 15, wherein the decomposition module pairs the source head words with translations in the target string so as to maximize the total measuring score.

18. The apparatus of claim 12, further comprising:

a transducer fragment recorder, coupled to the decomposition module, that records the transducer fragments that take part in translating the source string into the target string.

19. The apparatus of claim 18, wherein the transducer fragment recorder constructs at least initial and final head transducer states.

20. The apparatus of claim 19, wherein the transducer fragment recorder constructs transitions between head transducer states.

21. The apparatus of claim 20, wherein the head transducer building module assigns weights to the transitions between head transducer states.

22. The apparatus of claim 12, wherein the head transducer building module inputs the head transducer model into a transduction search module.

* * * * *